United States Patent [19]

Chang et al.

[11] 4,152,491

[45] May 1, 1979

[54] CELLS HAVING CATHODES CONTAINING CARBON MONOSULFIDE POLYMER CATHODE-ACTIVE MATERIALS

[75] Inventors: Chin H. Chang, Edison; Franklin J. Wright, Watchung; John M. Longo, New Providence, all of N.J.

[73] Assignee: Exxon Research & Engineering Co., Florham Park, N.J.

[21] Appl. No.: 919,140

[22] Filed: Jun. 26, 1978

[51] Int. Cl.² .............................................. H01M 6/36
[52] U.S. Cl. .................................. 429/112; 429/191; 429/194
[58] Field of Search ............... 429/112, 191, 194, 213, 429/196

[56] References Cited

U.S. PATENT DOCUMENTS

| | | | |
|---|---|---|---|
| 3,762,954 | 10/1973 | Metcalfe et al. | 423/460 |
| 3,811,947 | 5/1974 | Metcalfe et al. | 429/112 |

*Primary Examiner*—Charles F. LeFevour
*Attorney, Agent, or Firm*—Kenneth P. Glynn

[57] ABSTRACT

The present invention is directed to an electric current-producing cell which contains:

(a) an anode having as its anode-active material one or more alkali metals;

(b) a cathode having as its cathode-active material one or more polymer compounds having a plurality of carbon monosulfide units; and (c) an electrolyte which is chemically inert with respect to said anode and said cathode and which permits the migration of ions between said anode and said cathode.

16 Claims, 3 Drawing Figures

CELLS HAVING CATHODES CONTAINING CARBON MONOSULFIDE POLYMER CATHODE-ACTIVE MATERIALS

BACKGROUND OF THE INVENTION

1. Field of the Invention

The present invention relates to electric current-producing cells, and more particularly to such cells employing specific cathode-active materials comprising one or more polymer compounds having a plurality of carbon mono-sulfide units.

2. Prior Art

There has been considerable interest in recent years in developing high energy density batteries for voltaic cells. Exemplary of the developing systems is a high energy density electrochemical cell utilizing compounds of the transition metal chalcogenides such as titanium disulfide as cathode-active materials and using alkali metal anodes, e.g., as set forth in U.S. Pat. No. 4,009,052. U.S. Pat. No. 3,992,222 describes a cell having, for example, a lithium anode-active material, a molten electrolyte, and mixtures of $FeS_2$ and various metal sulfides as its cathode-active material. U.S. Pat. No. 4,049,879 describes alkali metal anode, chalcogenide cathode cells wherein the cathode-active chalcogenides are transition metal phosphorus chalcogenides such as $Li_4FePS_3$, $K_6FePS_3$, $Li_3FePS_3$, $LiNaFePS_3$, $LiNaK-FePS_3$, $LiK(NiFe)PS_3$, and the like. Other United States Patents, e.g. U.S. Pat. Nos. 3,645,792, 3,762,954 and 3,811,947, describe cells having, for example, alkali metal anodes, and carbon cathodes wherein these cathodes are treated with sulfur/sulfur compounds to yield carbon-containing, sulfur-containing cathode-active materials.

Although there has been extensive development of various alkali metal anode, sulfur, sulfur compound and carbon cathode cells such as those described in the above-mentioned exemplary prior art references, research continues for alkali metal anode, sulfur compound cathode type cells which exhibit acceptable cathode-active material capabilities yet utilize relatively inexpensive cathode-active materials. Notwithstanding the considerable variety of high energy density electrochemical cell systems which have recently been developed, it is believed that the particular cells of the present invention, which utilize a desirable combination of relatively inexpensive yet relatively active cathode-active materials, have not been heretofore disclosed or rendered obvious.

SUMMARY OF THE INVENTION

The present invention is directed to an electric current-producing cell which contains:

(a) an anode having as its anode-active material one or more alkali metals;

(b) a cathode having as its cathode-active material one or more polymer compounds having a plurality of carbon monosulfide units; and, (c) an electrolyte which is chemically inert with respect to said anode and said cathode and which permits the migration of ions between said anode and said cathode.

DETAILED DESCRIPTION OF THE INVENTION

Figure 1:
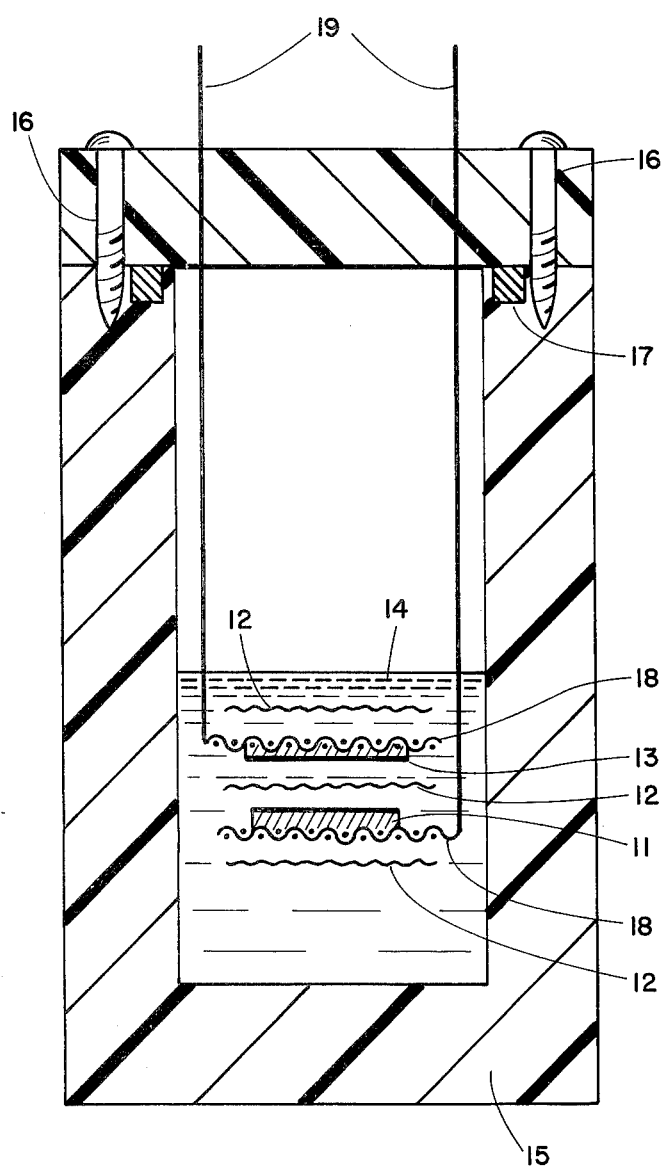

As mentioned, the electric current-producing cell of the present invention is one which contains a specified anode, a functional electrolyte, and a cathode having as its cathode-active material, one or more polymer compounds having a plurality of carbon monosulfide units.

In general, the anode employed in the cell of the present invention is one which contains as its anode-active material one or more metals selected from the group consisting of the Periodic Table Group IA metals. Of these Group IA metals, also known as the alkali metals, lithium and sodium are desirable. Preferred is the anode having lithium as its anode-active material. It should be noted that the alkali metals used in the anodes are meant to include both pure alkali metals and alloys containing these, e.g., lithium-aluminum alloys. The anode-active material may be in contact with other metal structures in the cell of the present invention, as desired. Thus, the anode-active materials, e.g. lithium, may be in contact with metal structures such as nickel, copper, or silver screen, which serve as current collectors. These anode configurations are a matter of design and are well known in the art.

The cathode employed in the cell of the present invention is one which contains as its cathode-active material one or more polymer compounds having a plurality of carbon monosulfide units, and may generally be written as:

$$(CS)_x \tag{1}$$

wherein x is an integer of at least 5. In general, this integer x may be at least 50 and is preferably at least 100. It is believed that there is no criticality to the upper limit of the variable x. In fact, typically, many hundreds of units of carbon monosulfide are contained in the polymer and it is believed that any $(CS)_x$ polymer of substantial length will provide useful electrochemical properties in the cells of the present invention.

The carbon monosulfide polymer cathode-active materials of the present invention may be prepared by any of a number of techniques which involve the polymerization of carbon monosulfide (CS). These techniques include photolysis of carbon disulfide and dissociation of carbon disulfide by electrical or microwave discharge.

The photolysis technique involves the decomposition of carbon disulfide in either the gas phase or liquid phase upon the absorption of ultraviolet radiations. The gaseous photolysis of carbon disulfide may be carried out at a pressure of at least 0.1 Torr. In general, the pressure may be in the range of 0.1 to 50 Torr, preferably in the range of 0.5 to 5 Torr. The ultraviolet radiation used may be in the range of 2300 to 4500 Angstrom (Å) which can be produced by mercury arc lamp. The temperature in which the photolysis of carbon disulfide is carried out may be in the range of 10° to 65° C. By irradiating the gaseous carbon disulfide, carbon monosulfide is produced through the photodissociation of carbon disulfide. The gaseous carbon monosulfide thus produced has a life time ranging from several seconds to several minutes depending on the carbon disulfide vapor pressure and conditions of the reaction vessel. While this material is gaseous carbon monosulfide, it is cooled to a temperature sufficient for it to condense (e.g. a liquid nitrogen trap at −196° C. is sufficient). The carbon monosulfide condensate is then allowed to warm up to room temperature, during which time the polymerization of carbon monosulfide and the separation of solid carbon monosulfide polymers occurs.

The dissociation of carbon disulfide by electrical discharge is generally carried out in the gas phase. The vapor phase of carbon disulfide is at least 0.1 Torr. In general, the pressure may be in the range of 0.1 to 50 Torr, preferably in the range of 0.5 to 5 Torr. The temperature in which the electrical discharge is carried out may be in the range of 10° to 65° C. The gaseous carbon monosulfide produced through the dissociation of carbon disulfide by electrical discharge has a life time ranging from several seconds to several minutes depending on the carbon disulfide vapor pressure and conditions of the reaction vessel. The preparation of carbon monosulfide polymers is followed by the cooling and subsequent condensation of gaseous carbon monosulfide in the manner described in the foregoing paragraph.

The use of microwave discharge to obtain the cathode-active material used in the cell of the present invention involves the dissociation of carbon disulfide in the gas phase by microwave discharge. In general, the pressure may be in the range of 0.1 to 50 Torr, preferably in the range of 0.5 to 5 Torr. The temperature in which the microwave discharge is carried may be in the range of 10° to 65° C. The gaseous carbon monosulfide produced through the dissociation of carbon disulfide by microwave discharge has a life time ranging from several seconds to several minutes depending on the carbon disulfide vapor pressure and conditions of the reaction vessel. The carbon monosulfide polymers are prepared by cooling and condensation of gaseous carbon monosulfide as described above.

Advantageously, the cathode-active materials used in the cells of the present invention may simply be hot pressed into a cathode structure, with or without supporting materials. The cathode-active material may be supported on structures such as carbon, copper, nickel, stainless steel, iron, etc., and it may be supported on such materials or it may be impregnated into such materials. In one preferred embodiment, the cathode does not contain any conductive diluents within the cathode-active material, such as elemental carbon. However, plastic binding agents such a polyfluoroethylene may be utilized if desired.

The electrolyte used in the cell of the present invention is any electrolyte which is chemically inert with respect to the anode and with respect to the cathode, and which permits the migration of ions between the anode and the cathode. The electrolyte may typically be a nonaqueous alkali metal salt-organic solvent electrolyte solution. These alkali metal salts are well known in the art and need not be enumerated herein. However, such salts include the lithium and sodium salt complexes which are dissolved in organic solvents such as inertly substituted and unsubstituted ethers, sulfones, organic sulfates, organic sulfites, organic nitrites and organic nitro compounds. One preferred electrolyte for use in conjunction with cells containing lithium as its anode-active material is an electrolyte containing lithium perchlorate salt dissolved in dioxolane or a dioxolane-containing solution. Alternatively, the electrolyte may be a solid such as beta-alumina or an alkali metal halide, or a metal salt.

The electric current-producing cells of the present invention containing the above-mentioned anodes, cathodes and electrolytes not only have high energy densities, but are also capable of being cycled through charging and discharging, and may readily be produced on a large-scale basis.

The present invention is illustrated by the following examples, but the invention should not be construed as being limited thereto.

EXAMPLE 1

Preparation of Carbon Monosulfide Polymer by Photolysis in Gas Phase

Carbon monosulfide polymer cathode-active materials were prepared by ultraviolet photolysis of carbon disulfide in the gas phase. The carbon disulfide pressure was controlled at 6–7 Torr by degassed liquid carbon disulfide immersed in a dry ice-acetone slurry maintained at temperatures between $-120°$ to $-130°$ C. The photolysis vessel was made of quartz and two high pressure mercury lamps (Q81, George W. Gates and Co.) were used outside the photolysis vessel. The carbon disulfide flow rate was maintained at about 70 micromole/sec. After the photolysis, carbon monosulfide and unreacted carbon disulfide were condensed in two traps controlled at about $-120°$ and $-196°$ C. with liquid $N_2^-$ n-pentane slurry and liquid $N_2$ respectively. Brownish polymers were isolated in the trap. The solid product was washed with liquid carbon disulfide several times in a dry box filled with argon and then it was dried in vacuum at 110° C. for two days before it was analyzed.

The solid material thus prepared has an amorphous structure as shown in the X-ray diffraction pattern. It is thermally stable up to 200° C. in inert gas as studied by thermogravimetric analyses. Elemental analyses on the materials so prepared are presented in Table I.

TABLE I

| Sample | Elemental Analyses for Carbon Monosulfide Polymers | | | | |
|---|---|---|---|---|---|
| | Carbon (Wt. %) | | Sulfur (Wt. %) | | |
| | Calculated | Observed | Calculated | Observed | C:S Ratio |
| 1 | 27.3 | 27.2 | 72.7 | 74.0 | 0.98:1 |
| 2 | 27.3 | 28.9 | 72.7 | 73.6 | 1.05:1 |

EXAMPLE 2

Preparation of Carbon Monosulfide Polymer by Photolysis in Liquid Phase

Carbon monosulfide polymer cathode-active materials were prepared by the photolysis of carbon disulfide in the liquid phase. Liquid carbon disulfide was placed in a quartz cell whose temperature could be maintained at about 24° C. The cell was also fitted with a magnetic stirrer in order to provide sufficient agitation to prevent preferential accumulation of the product of photolysis on the reactor wall closest to the ultraviolet light source.

The cell was irradiated with ultraviolet light produced by a 100 W Hanovia mercury lamp. Carbon monosulfide polymers produced by the method are insoluble in carbon disulfide. It therefore forms a dark reddish brown suspension which could be filtered off and collected. The product was further washed with fresh carbon disulfide several times in a dry box filled with argon gas. The material was then dried in vacuum at 110° C. overnight before it was analyzed.

The physical properties of the material thus prepared are similar to that of the material prepared according to Example 1. Elemental analyses on the material are shown in Table II.

TABLE II

Elemental Analyses for Carbon Monosulfide Polymer Prepared in Liquid Phase

| Element | Calculated (Wt. %) | Observed (Wt. %) |
|---|---|---|
| Carbon | 27.3 | 28.7 |
| Sulfur | 72.7 | 72.8 |
| Atomic Ratio (C:S) | 1:1 | 1.05:1 |

EXAMPLE 3

Discharge Characteristics of Carbon Monosulfide Polymer at 0.12 mA/cm$^2$

Figure 2:
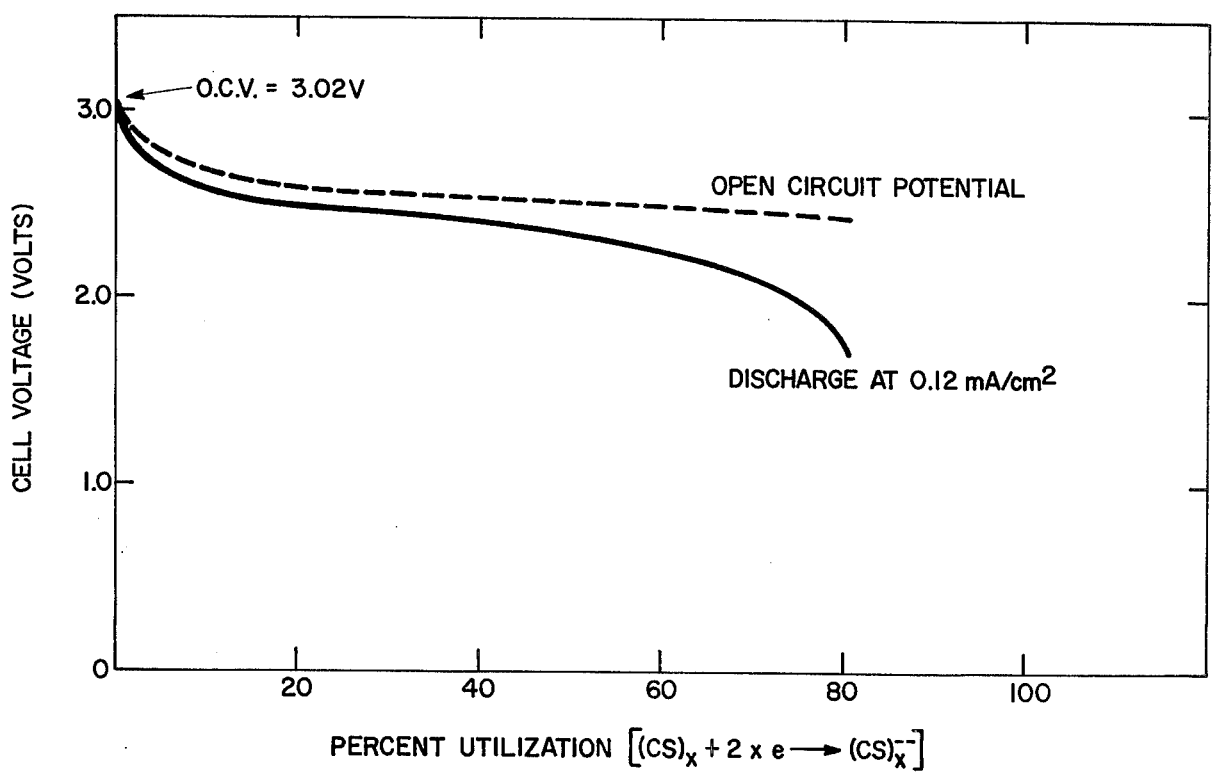

In this Example, 1.8 mg of carbon monosulfide polymer were mixed with 13 mg of graphite and 3 mg of polytetrafluoroethylene powder. Several drops of electrolyte were added to this mixture to form a thick paste. The paste was evenly spread in a 1 cm$^2$ cavity of a stainless steel pressing die positioned on a 1.2 cm×12 cm square nickel screen which had a sheet of polytetrafluoroethylene underneath. The nickel screen had a previously spot welded nickel wire lead attached. A 1 cm$^2$ polytetrafluoroethylene disc was then placed on the cavity and the assembly was pressed to 6000 lb. pressure at 24° C. for a period of several minutes. The lithium anodes were prepared by pressing commercial lithium ribbon (½ in. wide and 1/16 in. thick) onto a 1.2 cm×1.2 cm square nickel screen to which a nickel lead had previously been spot welded. The test cell was assembled as shown in FIG. 1. The cell includes a cathode-active material 11, and an anode-active material 13, each sandwiched between two layers of glass fiber filter paper 12. Both electrodes 11 and 13 and filter paper 12 were rigidly positioned on polytetrafluoroethylene supports (not shown). As described in the preparation of electrodes, the cathode-active materials 11 and anode-active material 13 are pressed onto Ni screens 18 with Ni wire 19 spot welded to the screens 18. The electrodes 11 and 13 and filter paper 12 are immersed in electrolyte 14 which is housed in a polytetrafluoroethylene container 15 with end cover 16 and O-ring 17 seal between the container 15 and cover 16. FIG. 2 shows the closed and open circuit potentials of the discharge of the above-described cell using an electrolyte consisting of one molar lithium perchlorate in a mixture of tetrahydrofuran and propylene carbonate.

EXAMPLE 4

Discharge Characteristics of Carbon Monosulfide Polymer at 0.2 mA/cm$^2$

Figure 3:
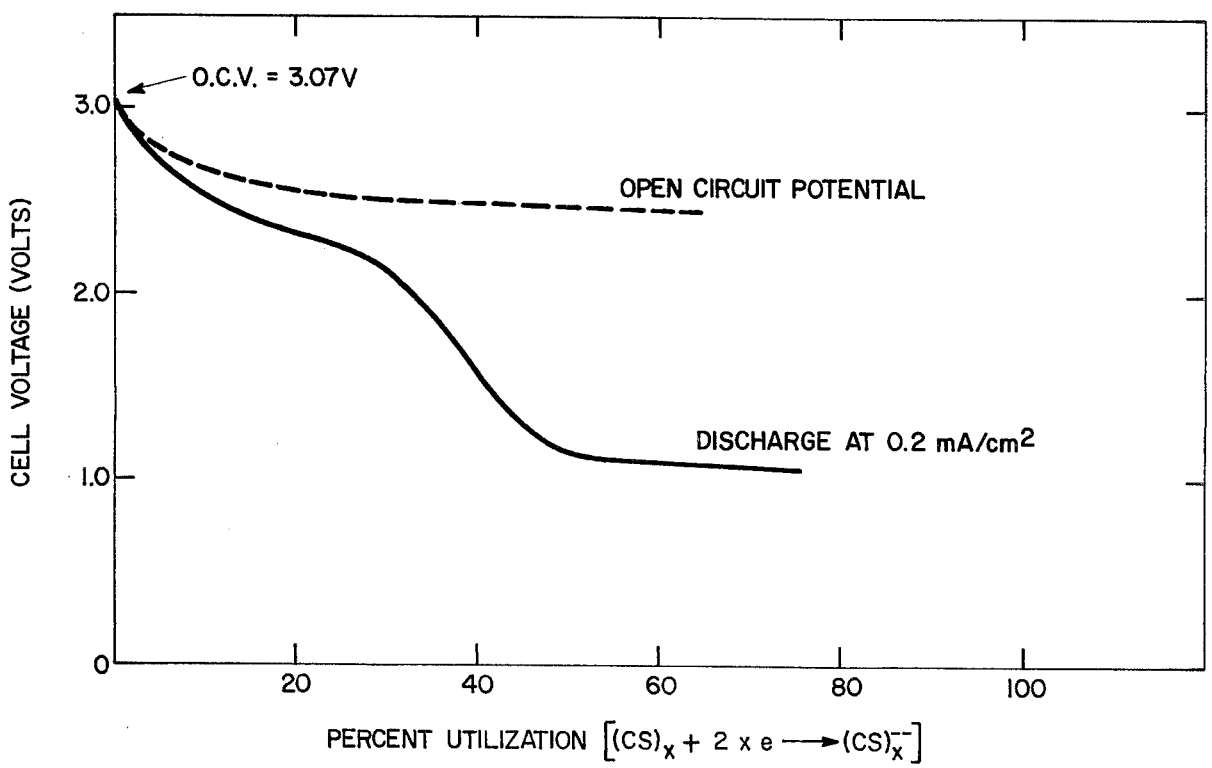

Following the general procedures of Example 3, a test cell containing 1.7 mg of carbon monosulfide polymer, 13 mg of graphite and 3 mg of polytetrafluoroethylene powder as the cathode mixture was assembled. The test cell was discharged at 0.2 mA/cm$^2$ instead of 0.12 mA/cm$^2$ for Example 3. FIG. 3 shows the closed and open circuit potentials.

What is claimed is:
1. An electric current-producing cell, comprising:
   (a) an anode having as its anode-active material one or more alkali metals;
   (b) a cathode having as its cathode-active material one or more polymer compounds having a plurality of carbon monosulfide units; and,
   (c) an electrolyte which is chemically inert with respect to said anode and said cathode and which permits the migration of ions between anode and said cathode.
2. The cell of claim 1 wherein said polymer has at least 5 carbon monosulfide units.
3. The cell of claim 2 wherein said polymer has at least 50 carbon monosulfide units.
4. The cell of claim 3 wherein said polymer has at least 100 carbon monosulfide units.
5. The cell of claim 1 wherein said anode-active material is selected from the group consisting of lithium and sodium.
6. The cell of claim 5 wherein said polymer has at least 5 carbon monosulfide units.
7. The cell of claim 6 wherein said polymer has at least 50 carbon monosulfide units.
8. The cell of claim 7 wherein said polymer has at least 100 carbon monosulfide units.
9. The cell of claim 1 wherein said anode-active material is lithium.
10. The cell of claim 9 wherein said polymer has at least 5 carbon monosulfide units.
11. The cell of claim 10 wherein said polymer has at least 50 carbon monosulfide units.
12. The cell of claim 11 wherein said polymer has at least 100 carbon monosulfide units.
13. The cell of claim 1 wherein the electrolyte contains at least one cyclic ether solvent.
14. The cell of claim 1 wherein said anode-active material is lithium and said electrolyte is a lithium salt dissolved in a solvent containing at least one organic ether.
15. The cell of claim 1 wherein the electrolyte is a solid.
16. The cell of claim 1 wherein the electrolyte is a molten salt.

* * * * *